United States Patent
Mirumachi et al.

[11] Patent Number: 5,530,304
[45] Date of Patent: Jun. 25, 1996

[54] MINIATURE MOTOR AND FAN USING THE SAME

[75] Inventors: Mitsuaki Mirumachi, Mito; Yoshinori Fukasaku, Hitachi; Takashi Yokoyama, Katsuta, all of Japan

[73] Assignees: Hitachi, Ltd.; Hitachi Automotive Engineering Co., Ltd., both of Japan

[21] Appl. No.: 184,313

[22] Filed: Jan. 21, 1994

[30] Foreign Application Priority Data

Jan. 20, 1993 [JP] Japan .................................. 5-007327

[51] Int. Cl.$^6$ ............................................. H02K 5/24
[52] U.S. Cl. ............................................. 310/51; 310/91
[58] Field of Search ..................... 310/51, 91; 335/248

[56] References Cited

U.S. PATENT DOCUMENTS 3,330,515  7/1967  Janssen et al. .......................... 310/51
4,596,921  6/1986  Hersh et al. .......................... 310/51 X
4,864,683  9/1989  Herron, Jr. et al. .................. 310/51 X
5,394,039  2/1995  Suchdeu et al. ........................ 310/51
5,397,950  3/1995  Norbury, Jr. et al. ............... 310/51 X

FOREIGN PATENT DOCUMENTS 2-75799  3/1990  Japan .
2-87952  3/1990  Japan .

*Primary Examiner*—Clayton E. LaBalle
*Assistant Examiner*—Judson H. Jones
*Attorney, Agent, or Firm*—Evenson, McKeown, Edwards & Lenahan

[57] ABSTRACT

To accomplish conflicting goals of weight and noise reduction in a small motor, a plastic motor case with a flange is divided into two parts in the axial direction and an elastic body is mounted between the motor body and motor case so as to absorb vibration. A thin end bracket and motor housing can be used and not only for weight reduction but also for noise reduction can be realized.

18 Claims, 10 Drawing Sheets

5,530,304

MINIATURE MOTOR AND FAN USING THE SAME

BACKGROUND AND SUMMARY OF THE INVENTION

The present invention relates to a motor and a motor case for a fan which may be used, for example, as a blower for a vehicle air conditioner. More particularly, the invention relates to a casing arrangement which permits the motor to be made small and light in weight, with reduced noise.

A blower motor for a vehicle air conditioner is generally attached to the blower housing via a steel mounting bracket which supports the motor. This type of motor conventionally has various shortcomings, such as difficult assembly and high cost of an integrally molded plastic flange. Also, the steel mounting bracket used to hold the motor in place is not interchangeable with respect to different motor sizes.

Japanese Patent Application Laid-Open No. 2-75799, discloses an arrangement for reducing noise and weight in which a plastic motor cover with an integrally molded flange and an elastic body are used together in place of a separate supporting flange. However, in that apparatus, the motor is held in the motor cover by means of screws, which can result in the transmission of excessive vibrations from the motor to the case and also does not allow for small variations in the size or shape of the motor housing.

Stringent environmental regulations and requirements which have recently been imposed have increased the need for reduction of the noise and weight of vehicles, to the point where it is no longer possible to achieve fully both goals by conventional means. For example, in the above Japanese Patent Application Laid-Open No. 2-75799 the motor housing and end bracket consist of thin or bored plates and a deeply drawn motor housing, while Patent Application Laid-Open No. 2-87952 utilizes a motor housing having open ends and an end bracket having a large opening. Although these arrangements achieve a weight reduction, they also cause an increase in noise due to insufficient structural rigidity. Thus, the objectives of reducing both weight and noise have come into conflict.

An object of the present invention is therefore to provide a small motor which realizes both a weight reduction of the motor housing and bracket, and a noise reduction as well.

SUMMARY OF THE INVENTION

This and other objects and advantages are achieved by the present invention, in which a generally cylindrical motor case (which holds the motor itself) is divided into two parts in the axial direction. That is, the two parts (or halves) of the case are divided by a plane which is perpendicular to the longitudinal axis of the cylindrical case, and the motor is held and secured between two case halves by means of a compressible elastic supporting member, with gaps provided between the sides of the case and the motor housing.

In this manner, the transmission of vibrations of the motor to the outside can be minimized. Since the contact area between the motor housing and the motor case is minimized, the vibration transfer path is reduced, and noise generation is suppressed.

Other objects, advantages and novel features of the present invention will become apparent from the following detailed description of the invention when considered in conjunction with the accompanying drawings.

DETAILED DESCRIPTION OF THE DRAWING

Figure 1A:
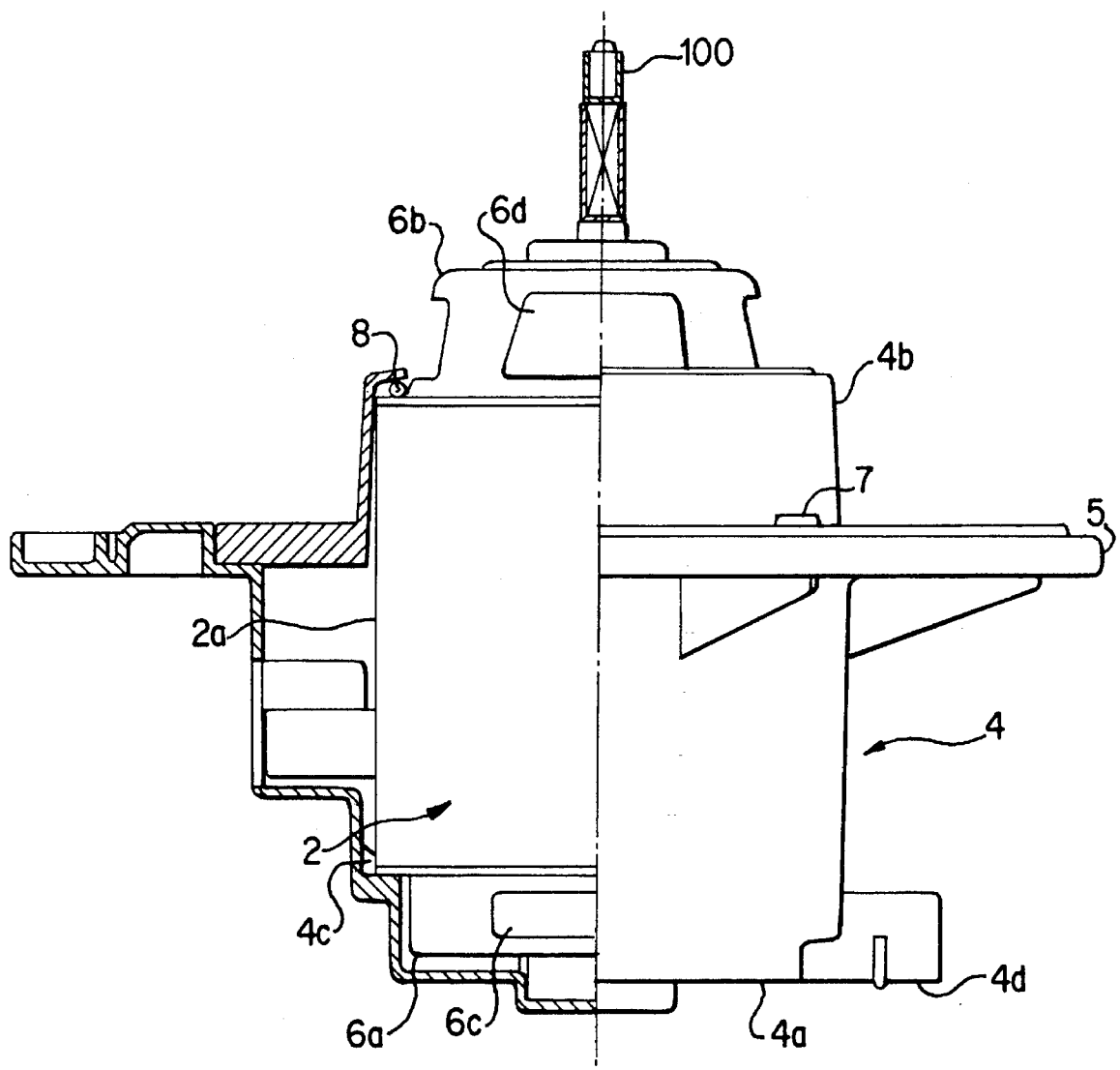
FIGS. 1A is a partial cross sectional front view, taken along line I—I in FIG. 2, showing an embodiment of the present invention, in which the motor is depicted schematically.
Figure 1B:
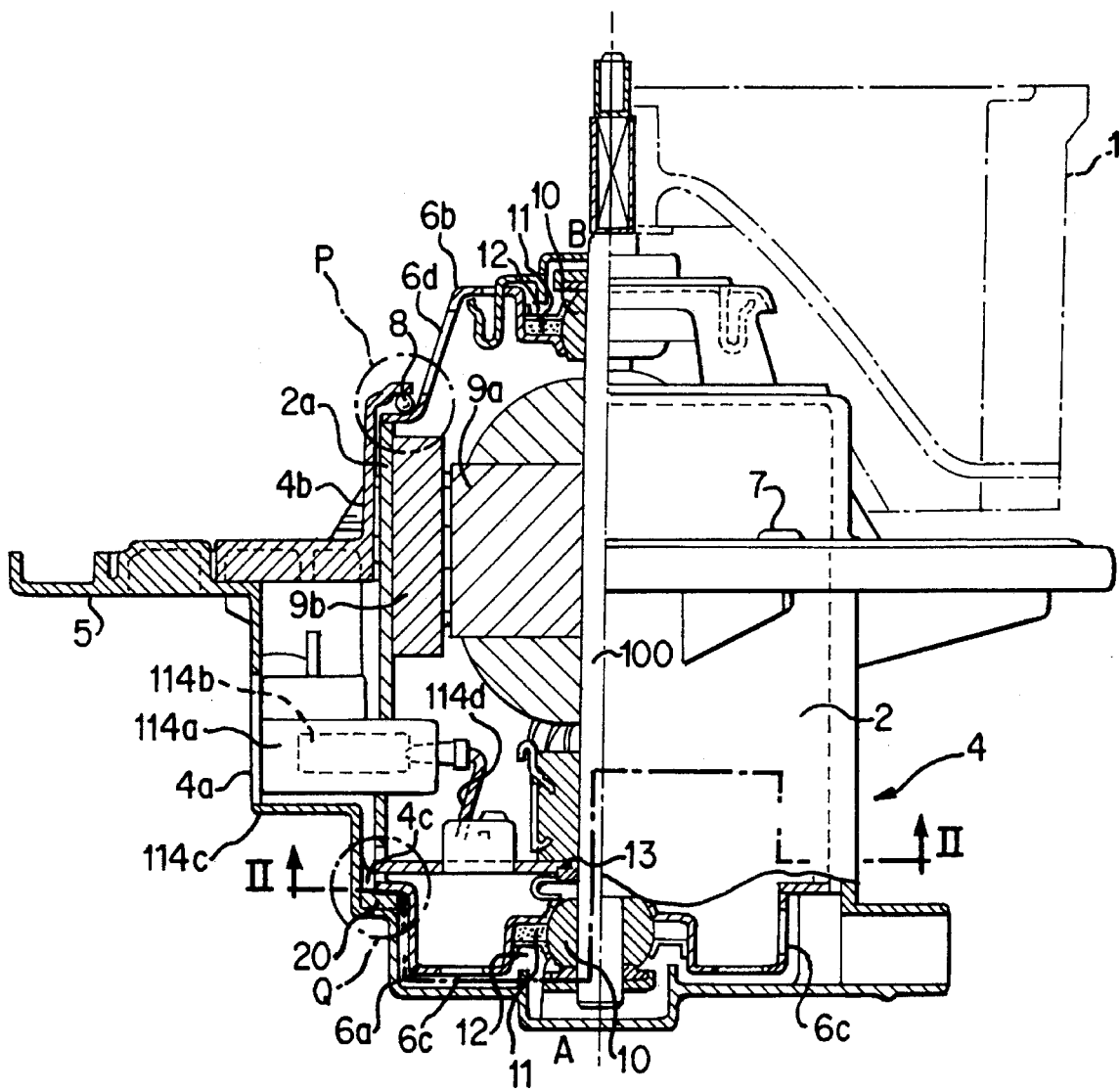
FIG. 1B is a partial cross sectional front view of the embodiment of FIG. 1A, which shows some of the construction details of the motor.
Figure 2:
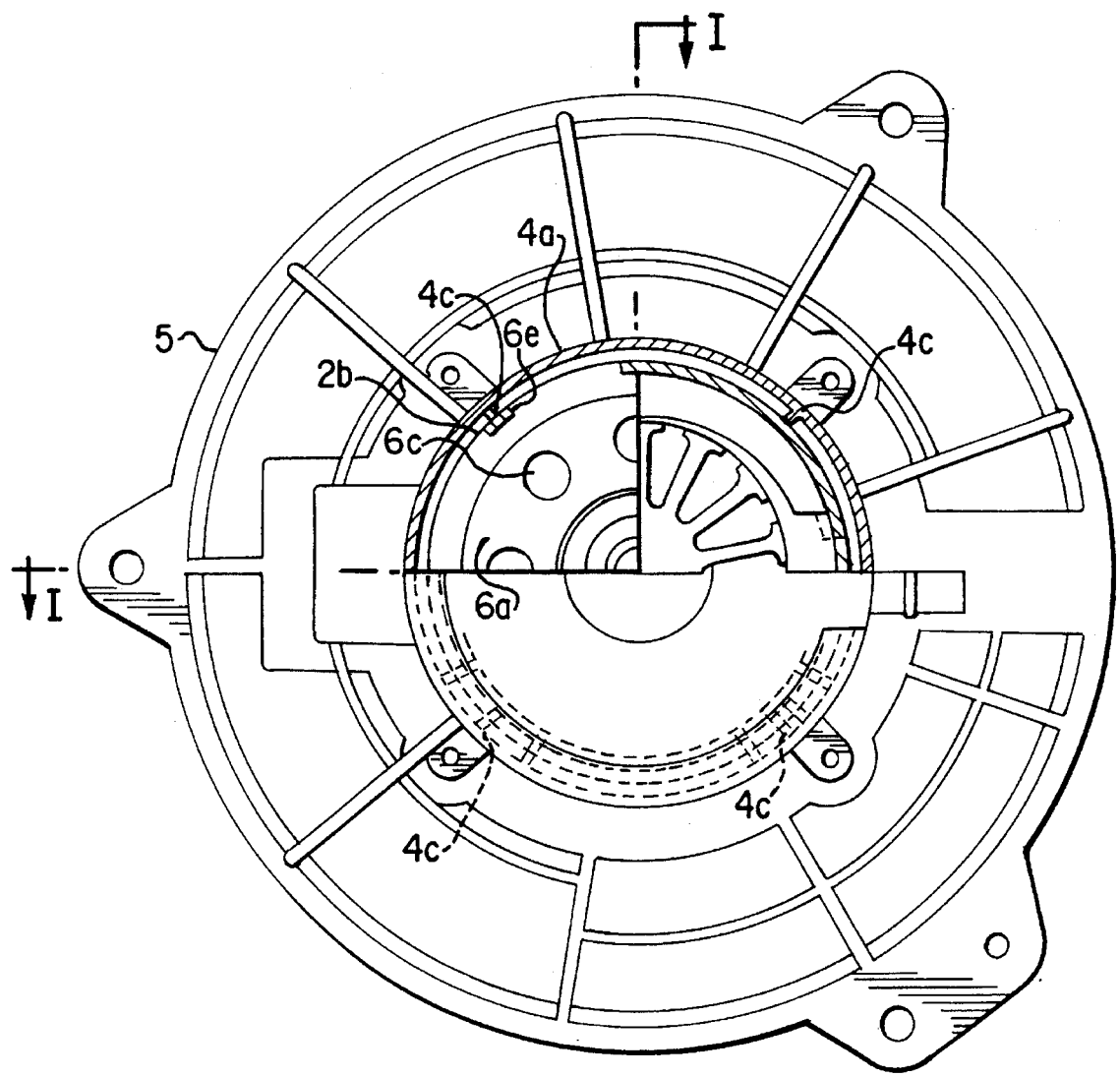
FIG. 2 is a partial cross sectional bottom view of the embodiment of FIGS. 1A and 1B taken along line II—II in FIG. 1B.

FIGS. 1A and 1B show a front sectional view of a first embodiment of the invention, taken along line I—I in FIG. 2. The motor 2 for driving a fan 1 (FIG. 1B) is supported in a generally cylindrical case 4, which comprises an upper part 4b and a lower part 4a. The lower part 4a has an integrally molded peripheral flange 5 at the open upper end thereof which receives and cooperates with the upper part 4b to form the case 4. The upper and lower parts 4b and 4a of the case are joined and held together by joining members 7 which may be, for example, screws. The flange 5, which projects radially outward at the periphery of the case 4, serves as a mounting member to secure the motor and case to a blower casing (not shown), such as in a vehicle air conditioner.

Figure 5:
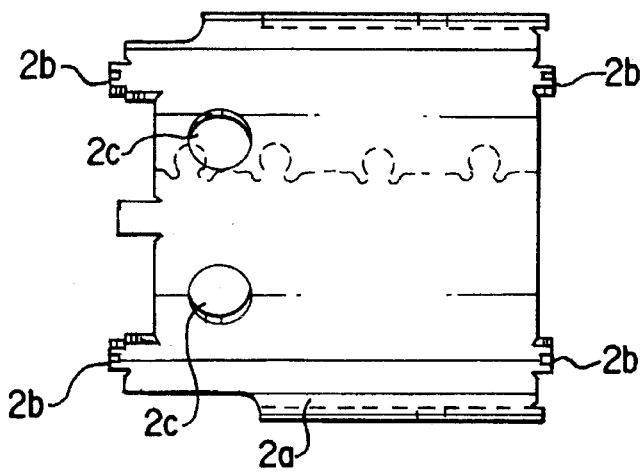
FIG. 5 shows the shape of a motor housing of an embodiment of the present invention.

The exterior surface of the motor 2 which is supported in the case 4, is defined by a generally cylindrical housing 2a, which is open at either end, and by end brackets 6a and 6b which close off the open ends. As shown in FIG. 5, the housing 2a is made from a thin sheet plate which is formed into a cylinder and clinched so that both ends are open. Protruding axially at the periphery of the open ends are a plurality of mounting studs 2b which are used to secure the end brackets 6a and 6b in position. For this purpose, each of the end brackets 6a and 6b, which are also made of thin steel plates (1.6 mm or less) that are blanked and drawn, has on its periphery a plurality of notches which correspond to the positions of the mounting studs 2b. The end brackets are assembled with the cylindrical housing by placing them over the respective open ends of the housing 2a, aligned so that the mounting studs 2b project through the notches, and the mounting studs (which are themselves notched) are then splayed circumferentially so that the end brackets are held in place.

As can be seen in FIG. 5, the peripheral surface of the cylindrical housing 2a has a plurality of holes 2c cut therein, which serve to reduce the overall weight of the motor. Similarly, the end brackets 6a and 6b also have a plurality of irregular holes 6c, 6d (FIG. 1A, 1B and 2) therein, for the same purpose. One effect of such weight reduction measures, of course, is a weakening of the structural rigidity of the motor housing. This effect, however, is counteracted by the motor case according to the invention.

As shown in FIG. 1B, the shaft 100 of the motor 2 is supported by bearings 10, which are fixed to the end brackets 6a and 6b by axial springs 12 and an oil supply packing 11. A brush holder 13 is connected to an external power source (not shown) by means of lead wire 114d which is coupled to connector lugs 114b in connector housing 114a, which opens to the exterior at 114c. The rotor windings 9a mounted on the shaft 100 and a permanent magnet 9b are depicted schematically.

Returning now to the details of the case 4, a plurality of radially inwardly projecting rib-like spacers 4c (FIGS. 1A and 2) are arranged on the inner surface of the lower part 4a of the case 4. The spacers 4c conform to and bear against the outer periphery of the motor housing 2a when the motor 2 is inserted into the part 4a, and serve to hold the motor in position. That is, spacers 4c have an inward radial projection such that the unobstructed interior diameter of the lower case part 4a is slightly less than the exterior diameter of the motor 2, and the tips of the spacers 4c are thus deformed to adapt to the exterior surface (shape and size) of the motor 2 when it is inserted, thus securing the motor. Moreover, the spacers 4c are positioned circumferentially at points corresponding to the circumferential location of the mounting studs 2b, which form the connection between motor: housing 2a and the end brackets 6a and 6b (FIG. 2), and provide additional rigidity to the motor housing 2a, which is otherwise weakened by weight reduction measures, thus helping to maintain the proper shape of the outer surface of the motor 2.

Figure 3:
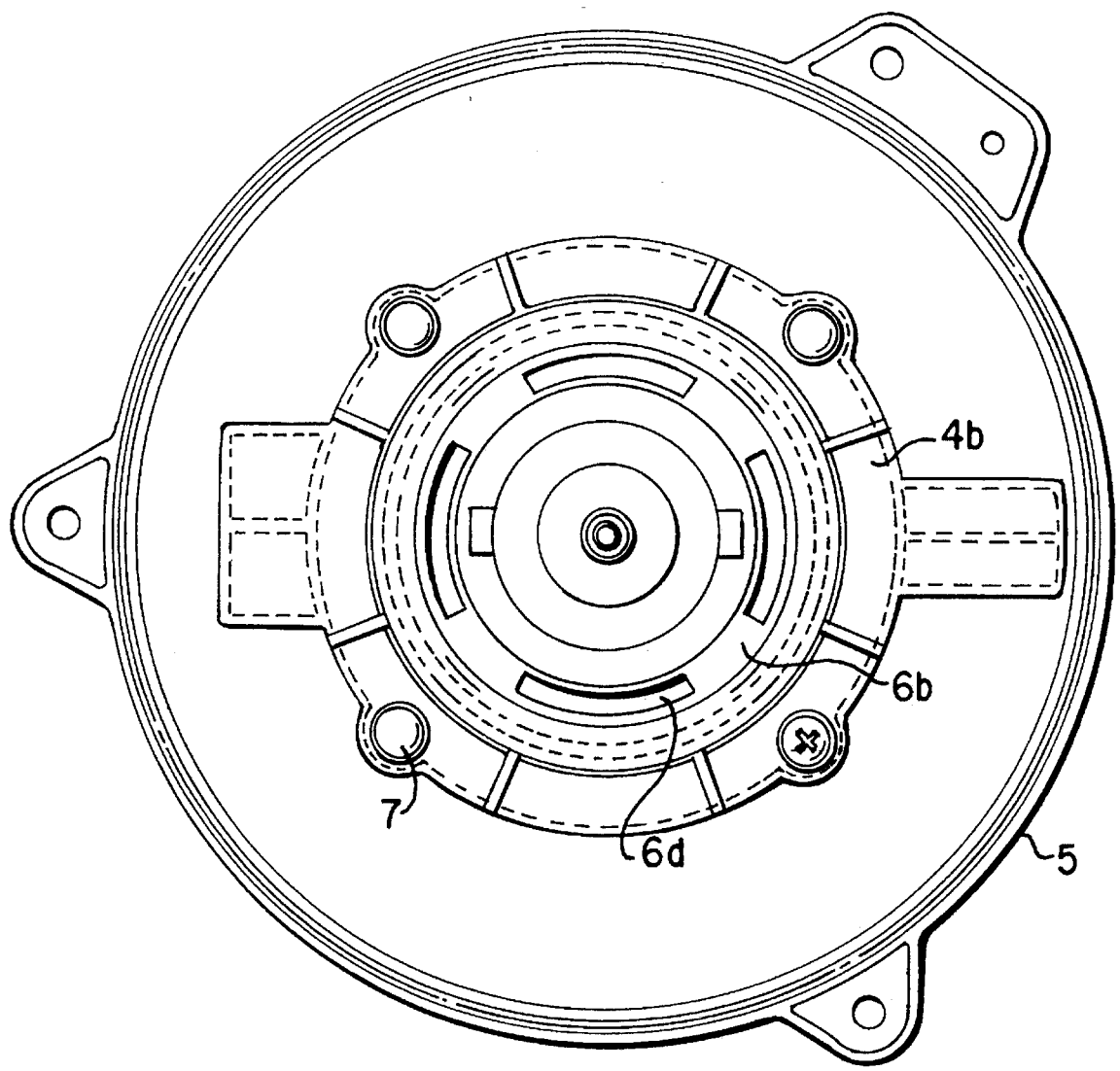
FIG. 3 is a plan view of the embodiment of FIGS. 1A and 1B.

To complete the motor case 4 according to the present invention, the upper part 4b is placed over the motor 2 (which has been inserted in the lower portion 4a), and secured to the lower portion 4a by means of fasteners such as screws, as noted previously. As shown in FIGS. 1A, 1B and 3, the top portion of the upper part 4b is open, and the end bracket 6b of the motor 2 projects axially upwardly through the opening. In the embodiment of FIGS. 1A and 1B, a circular elastic body in the form of an O-ring 8 is mounted between the end bracket 6b and the inside surface of the upper part 4b. When the upper part 4b is securely fastened to the lower part 4A as noted previously, O-ring 8 is elastically compressed and bears against the end bracket 6b, thus securing the motor 2 against axial movement within the case 4.

The location of the o-ring 8 when the motor is inserted into the case 4 is roughly determined by the protrusions 2b (which connect the motor housing 2a with the end bracket 6b) and by the inclined end face of the end bracket 6b. With such an arrangement, the body of the motor can be positioned more easily, and variations in its axial dimension can be easily absorbed by the o-ring when the motor is held in the case 4.

On the side of the motor case 4a, a cooling air pipe connector 4d for cooling the motor 2 is mounted, and a suitable cooling pipe is attached to the connector so as to cool the inside of the motor. A large slotted hole is made in the surface opposite this connector, such as hole 6c of the end bracket 6a which is explained previously.

According to the present invention, having the above-described construction, the noise and vibrations from the motor 2 are shielded by the motor case 4. That is, in the lower portion 4a, contact with the motor 2 is provided by the spacers 4c, so that a gap or separation exists between almost the entire interior surface of the lower case part 4a and the motor housing 2a. Thus, circular ring vibrations (that is, radial vibrations in the surface of the housing 2a) generated by the motor 2 are not amplified because a vibrational mode occurs at the points at which the housing 2a is in contact with the rib 4c of the housing part 4a. Moreover, vibrations in the axial direction (which occur primarily in the end face of end bracket 6a) are not transmitted to the lower portion 4a because the housing 2a is not in direct contact with the end face of the end bracket 6a.

In addition, the elastic body of the O-ring 8 mounted between the end bracket 6b and the upper part 4b of the case 4 suppresses vibrations generated from the end bracket 6b. Moreover, the upper part 4b is not affected substantially by the circular ring vibration from the side of the motor, which is absorbed by the elastic body 8 in the same way as with the vibration from the end face of the end bracket 6b. On the other hand, since the elastic body 8 is held and secured, it is compressed and hence presses the inner periphery of the end bracket 6b as a repulsion force. As a result, play in the axial and radial directions in the motor case caused by dimensional variations of the motor housing 2a and the motor case 4 can be prevented.

Since the motor case according to the present invention, can be assembled simply in the axial direction, the problem of a lack of a lack of interchangeability of a mounting flange of a conventional motor, an increase in noise, and an increase in costs can be eliminated. Furthermore, according to this structure, the elastic body used for the upper case part 4b may be changed to other shapes, such as an irregular shaped member or a flat disk, so long as it is held and secured between the lower part 4a and the end bracket 6a or between the joint faces of the upper part 4b. Also, other types of elastic structures, such as for example, a wave spring, may be used.

Figure 1C:
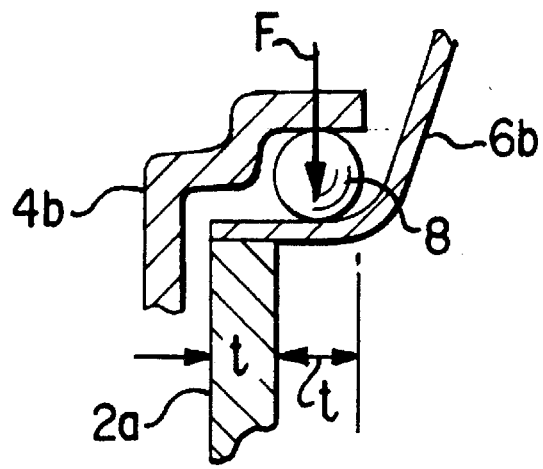
FIG. 1C is an enlarged cross sectional view showing the details of a portion P of FIG. 1B.
Figure 1D:
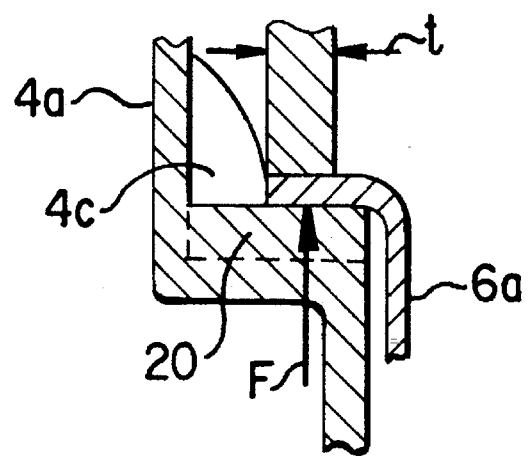
FIG. 1D is an enlarged cross sectional view showing the details of a portion Q of FIG. 1B.

FIGS. 1C and 1D show construction details of the casing 4 with the motor 2 installed therein, according to the embodiment in FIG. 1B. As can be seen in FIGS. 1C and 1D, end portions of the lower case part 4a and the upper case part 4b exert a force F in the axial direction on the motor housing 2a, and hold it in place. (In the instance of the upper case part 4b, the force is exerted via the elastic body 8.) This arrangement effectively damps the transmission of vibrations from the end brackets a and 6b toward the end portions of the upper and lower case parts 4a and 4b.

In order to assure effective damping of vibrations in this manner, it is important that the contact point at which the force F is generated by the upper and lower case parts 4b and 4a be properly located. That is, the point at which force F is exerted by the lower case part 4a which has no elastic body 8) must be located within a range of the thickness $\tau$ of the motor housing 2a. For the upper case part 4b, on the other hand, since the elastic body 8 can absorb the vibration to an extent, the contact point for exertion of the force F must be located within a range twice the thickness of $\tau$ of the motor housing 2a, measuring from its outer perimeter, as shown in FIG. 1C.

Furthermore, when the motor 2 is installed with its rotating shaft 100 aligned in the direction of the earth's gravitational force, the elastic body 8 must be mounted at the upper end, while at a lower end, the motor is supported through a member having a rigidity greater than that of the elastic body 8 (preferably, a member in which the elastic deformation does not occur, and which may be constituted by a part of the case 4). In this manner a permanent deformation of the elastic body (and loosening of the motor mounting) can be avoided.

FIGS. 1A through 3 show an embodiment of the invention in which the elastic body 8 is installed at the fan end of the case 4. FIG. 4 illustrates another embodiment in which the elastic body 8 is installed at the end opposite the fan. The construction of the motor shown in FIG. 4 is the same as that shown in FIGS. 1–3 except for the shape and location of the elastic body 8. Therefore, further explanation of other elements will be omitted.

Figure 4A:
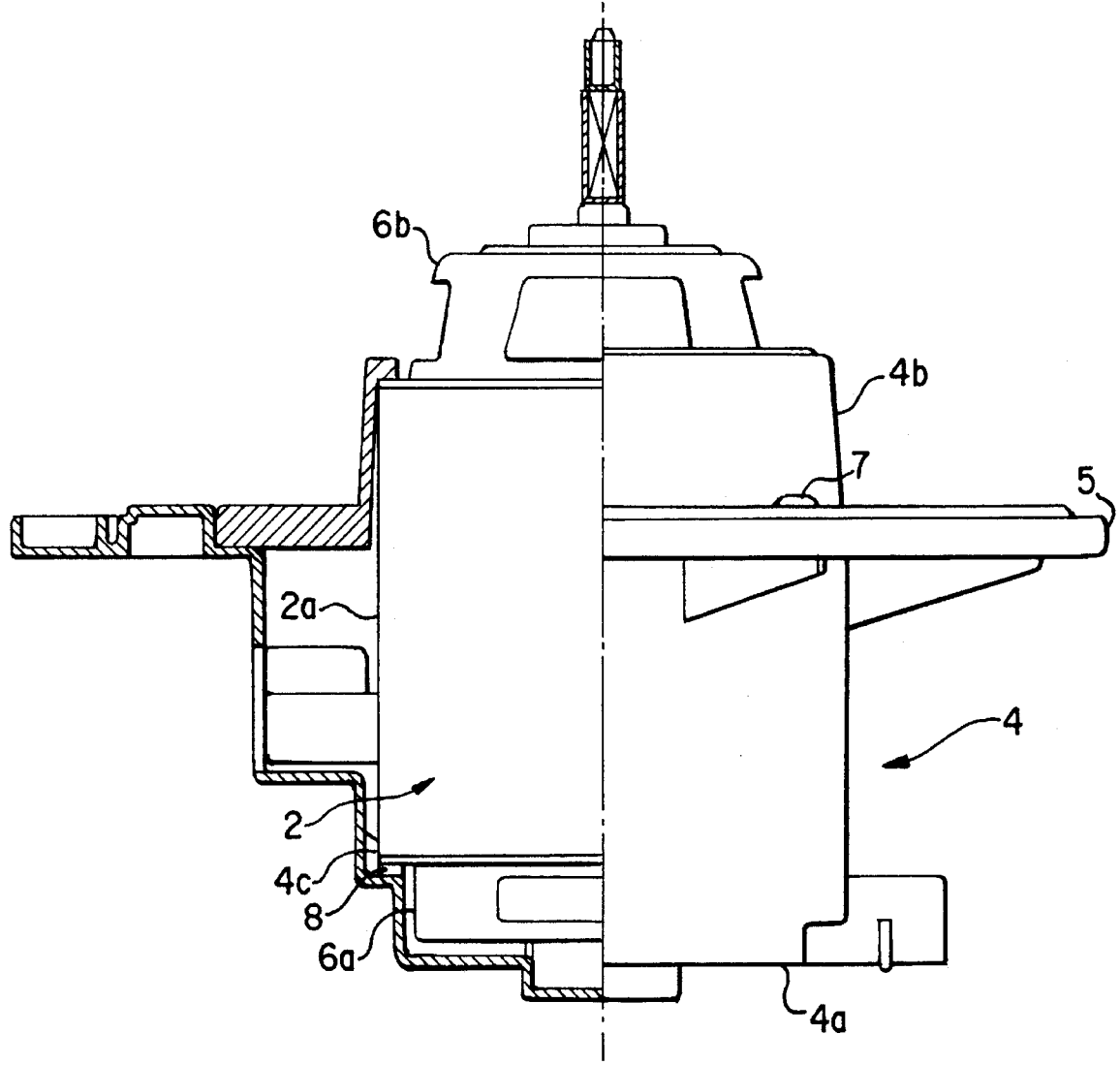
FIGS. 4A and 4B show a partial cross sectional view, taken along line IVA,B—IVA,B of FIG. 4C, of another embodiment of the present invention, with the motor being depicted schematically in FIG. 4A.
Figure 4B:
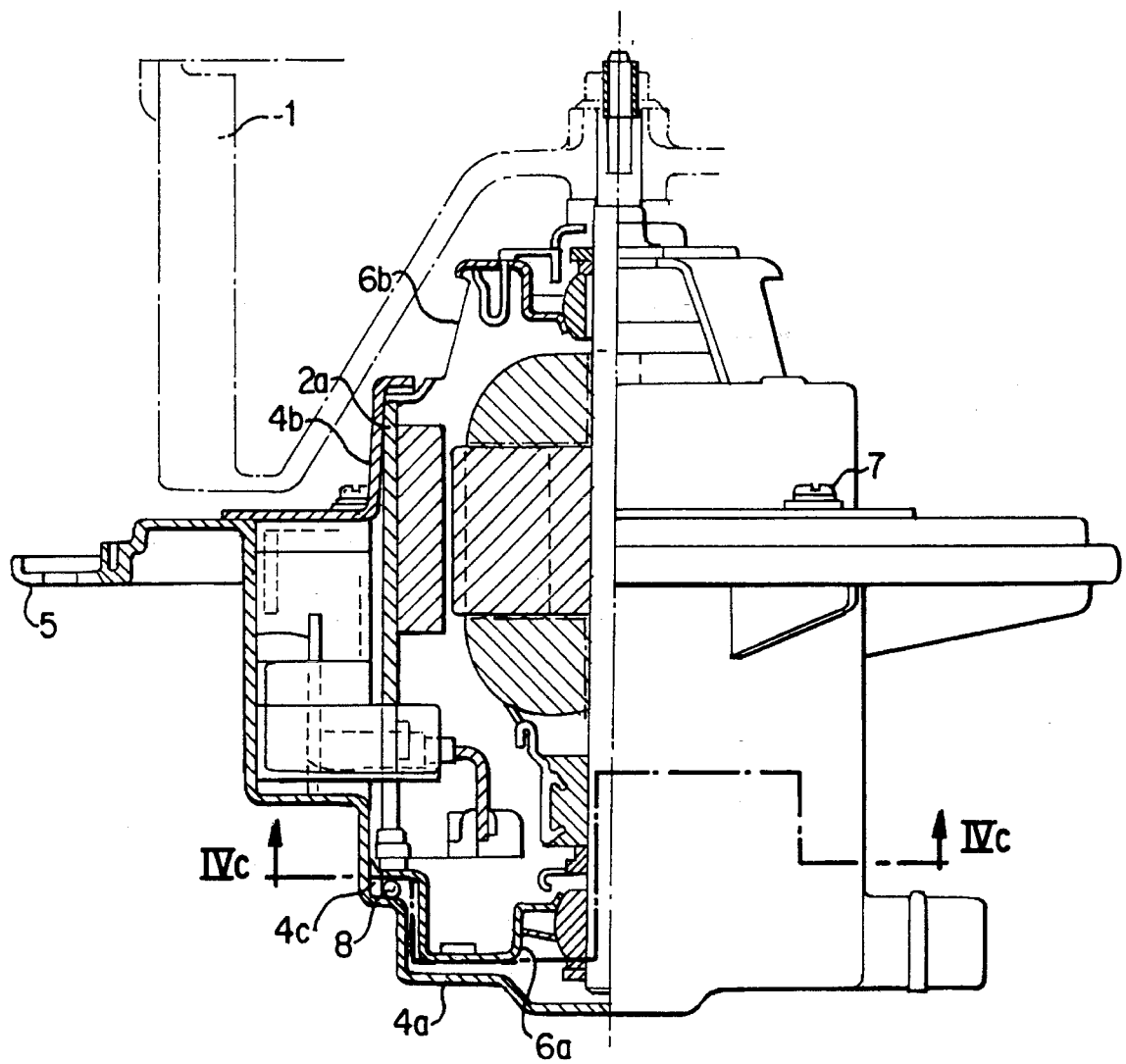
Figure 4C:
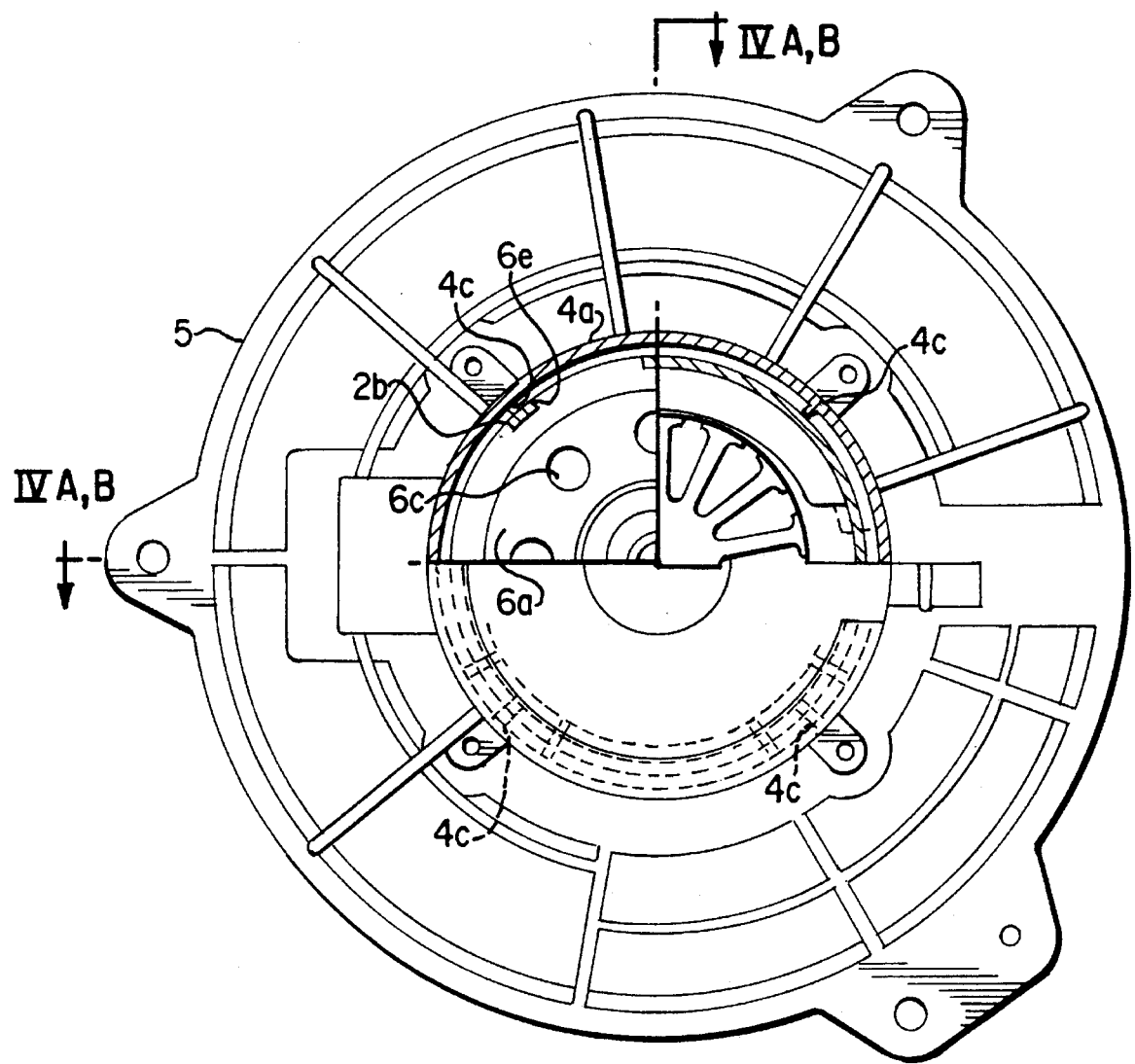
FIG. 4C is a partial cross sectional plan view, taken along line IVC—IVC of FIG. 4B, of the embodiment of FIGS. 4A and 4B.
Figure 7:
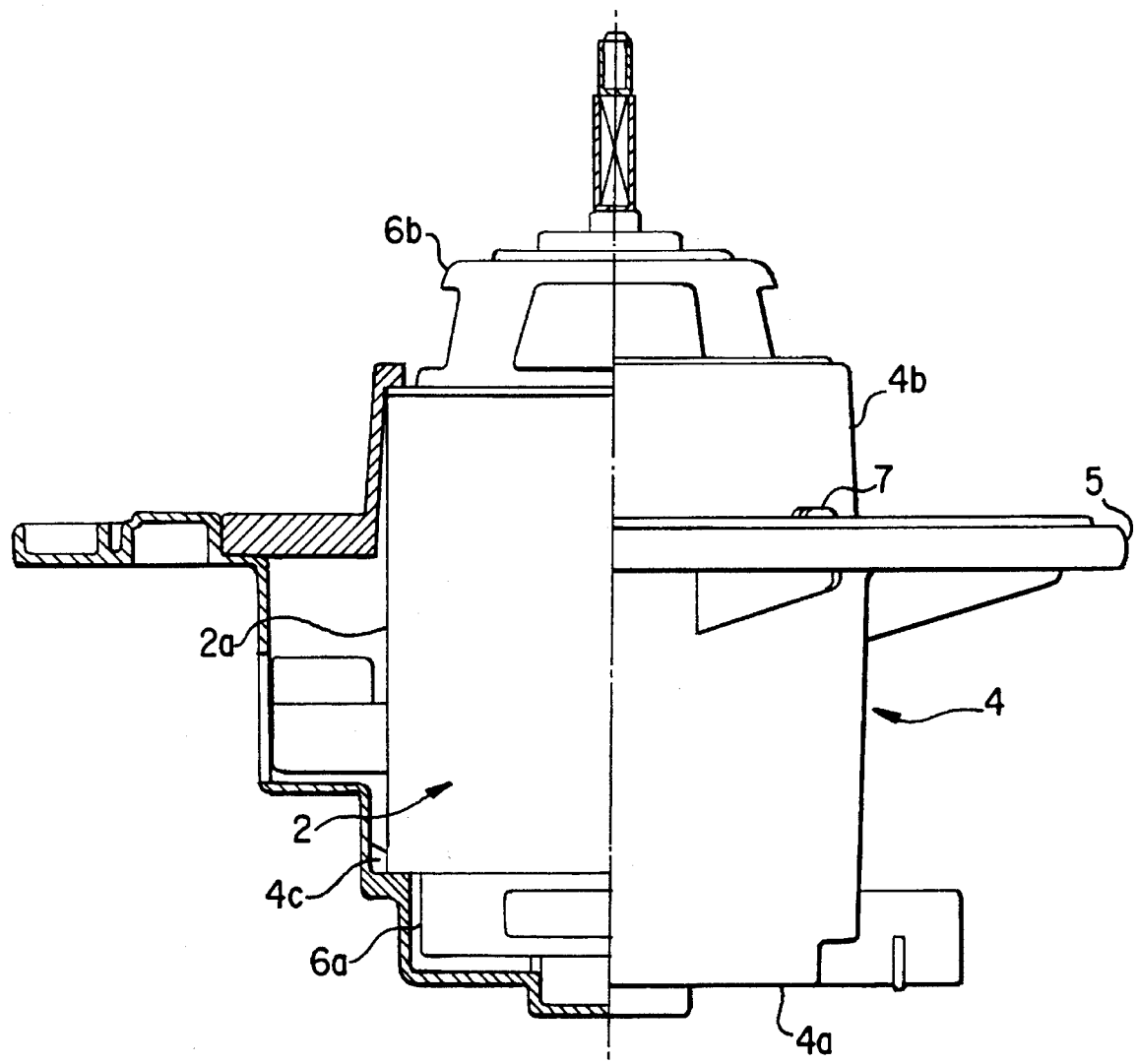
FIG. 7 is a partial cross sectional view of a further embodiment of the invention, in which the casing itself is elastic.

In FIGS. 4A and 4B, the elastic body 8 is installed between the end face of the end bracket 6a and the lower case part 4a. To minimize the transfer of axial disk vibrations from the end bracket 6a to the lower housing part 4a, it is desirable to locate the elastic body at a node of such disk vibration (that is, where the axial vibration is as small as possible). Because such a node naturally occurs near the periphery of the end bracket 6a, it is thus advantageous to install the elastic body 8 there. In the embodiment of FIG. 4, a plate-shaped, washer-shaped or toroidal elastic body 8 is used, and the end face of the end bracket 6a at the upper part of the axial spring 12 absorbs vibration. Alternatively, the elastic vibration absorbing element may be constructed as an integral part of the upper and/or lower case parts 4b and 4a, as shown in the embodiment of FIG. 7, in which the casing itself is elastic.

The hardness of the material from which the plastic body is made may be up to 65° of Shore hardness. When the hardness is more than 65°, the plastic body becomes highly rigid, and cannot be compressed sufficiently to absorb dimensional variation and vibration in the axial direction. The material in this case is rubber or an admixture of rubber (base material) and resin or expanded material.

According to the present invention, the motor is contained in the divided motor case and is in contact with the inner peripheral surface of the motor case only near the connection of the motor housing with the end brackets. A gap is thereby provided between the motor case and the external surface of the motor, so that vibration transfer is minimized. Furthermore, since an elastic body is mounted between the motor body and motor case, dimensional variations in the axial direction and axial vibration can be absorbed by the repulsion force of the elastic body regardless of the rigidity of the motor, and with no play between the motor and motor case. As a result, the competing goals low noise and light weight can both be accomplished.

Figure 6:
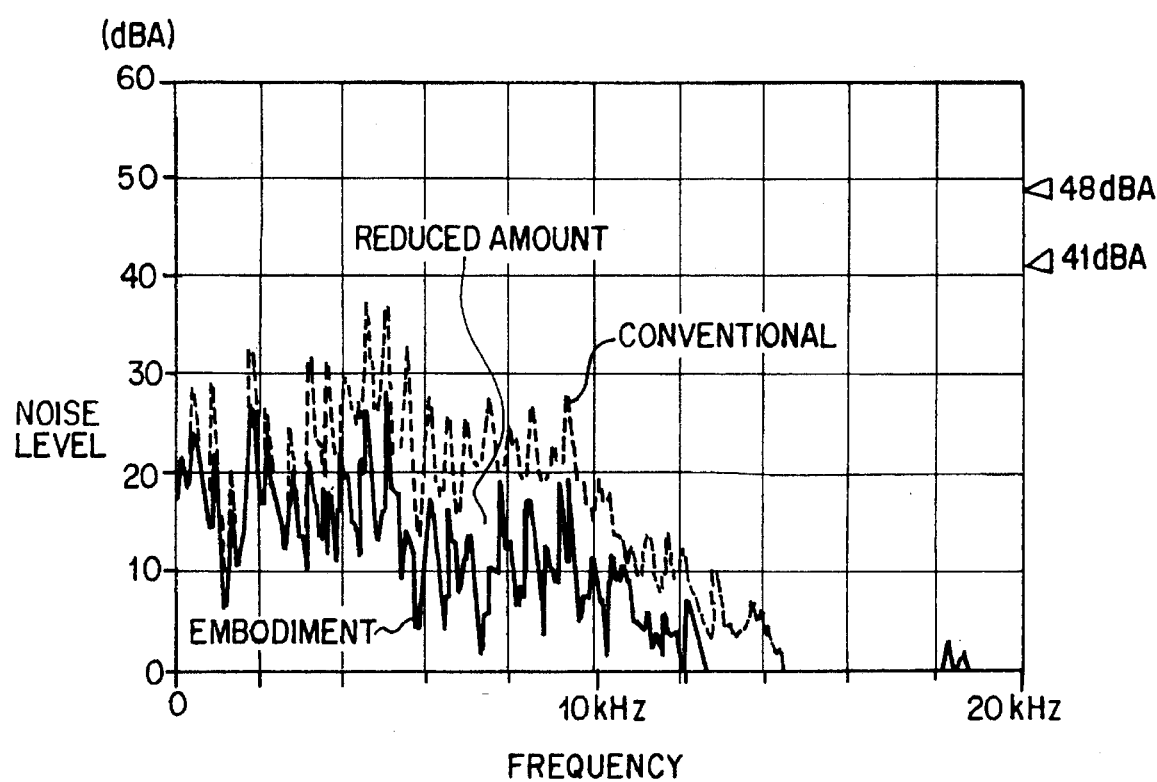
FIG. 6 shows analytical results of noise frequencies of an individual motor, showing the noise reduction effect of an embodiment of the present invention.

FIG. 6 is a graphic display of the experimentally determined noise reduction effect of an embodiment of the invention. It shows that the noise level is lowered in a wide frequency band, and that there is a low noise effect of 4 dBA or more at overall values.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A casing unit for holding an electric blower fan motor, comprising:

a first casing part having at least one open end;

a second casing part having at least one open end;

open ends of said first and second casing parts being connectable in an axial direction to form a space for holding an electric motor; and an elastic member arranged in at least one of said casing parts at an end thereof opposite said open end;

said elastic member being compressible in an axial direction between said at least one of said casing parts and a motor inserted into said space, when said open ends of said first and second casing parts are connected in said axial direction;

wherein at least one of said casing parts has a plurality of radially inwardly projecting spacers arranged on an inner surface thereof which contact the outer peripheral surface of a motor inserted therein only in an area of an axial extremity of said motor.

2. Casing unit according to claim 1 wherein one of said first and second casing parts has a radially extending peripheral flange for securing said motor to a blower fan housing.

3. Casing unit according to claim 1 further comprising a plurality of connecting members for connecting said first and second casing parts in said axial direction.

4. Casing unit according to claim 1 wherein said connecting members are screws.

5. Casing unit according to claim 1 wherein said elastic member is a toroidal in shape and is arranged near a periphery of said at least one casing part.

6. Casing unit according to claim 1 wherein said elastic member is washer shaped and is arranged near a periphery of said at least one casing part.

7. Casing unit according to claim 5 wherein an end portion of said motor extends through a central opening of an end of said first casing part opposite said open end thereof, and said elastic member is compressed between an end surface of said motor and an inside surface of an inwardly projecting peripheral flange of said end of said first casing part opposite said open end thereof.

8. Casing unit according to claim 6 wherein an end portion of said motor extends through a central opening of an end of said first casing part opposite said open end thereof, and said elastic member is compressed between an end surface of said motor and an inside surface of an inwardly projecting peripheral flange of said end of said first casing part opposite said open end thereof.

9. Casing unit according to claim 1 wherein said first and second casing parts have a substantially cylindrical shape.

10. Casing unit according to claim 1 wherein an end portion of a first end of said motor extends through a central opening of an end of said first casing part opposite said open end thereof, and said elastic member is compressed between an end surface of said motor opposite said first end and an interior end surface of said second casing element.

11. Casing unit according to claim 5 wherein an end portion of a first end of said motor extends through a central opening of an end of said first casing part opposite said open end thereof, and said elastic member is compressed between an end surface of said motor opposite said first end and an interior end surface of said second casing element.

12. Casing unit according to claim 6 wherein an end portion of a first end of said motor extends through a central opening of an end of said first casing part opposite said open end thereof, and said elastic member is compressed between an end surface of said motor opposite said first end and an interior end surface of said second casing element.

13. Casing unit according to claim 1 wherein said elastic member is formed as an integral part of said casing part.

14. Casing unit according to claim 5 wherein said elastic member is formed as an integral part of said casing part.

15. Casing unit according to claim 6 wherein said elastic member is formed as an integral part of said casing part.

16. Casing unit according to claim 10 wherein said elastic member is formed as an integral part of said casing part.

17. Casing unit according to claim 1 wherein said spacers have an inward radial projection such that, prior to insertion of said motor, an unobstructed interior diameter of said at least one-of said casing parts is smaller than an exterior diameter of said motor.

18. Casing unit according to claim 17 wherein said spacers are deformable to conform to exterior size and shape of said motor.

* * * * *